Figure 1:
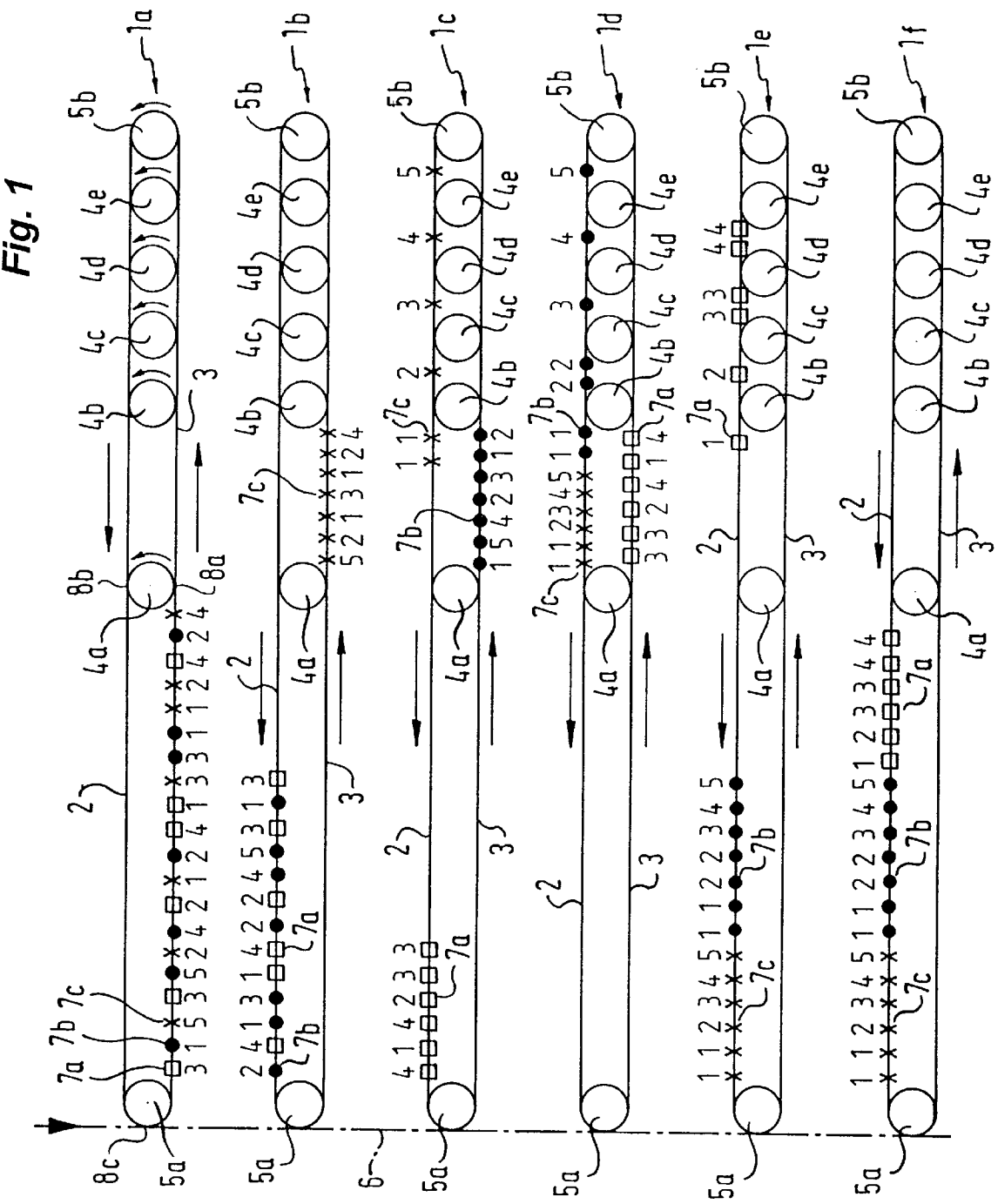

United States Patent [19]
Enderlein et al.

[11] Patent Number: 5,806,434
[45] Date of Patent: Sep. 15, 1998

[54] INSTALLATION FOR THE SORTING OF INDIVIDUALLY CONVEYED OBJECTS

[75] Inventors: Robby Enderlein, Landsberg a. Lech; Johann Robu, Olching, both of Germany; Hansjörg Geiger, Schwaz, Austria

[73] Assignee: MTS Modulare Transport Systeme GmbH, Vomp, Austria

[21] Appl. No.: 727,492

[22] PCT Filed: Jan. 27, 1995

[86] PCT No.: PCT/EP95/00299

§ 371 Date: Oct. 7, 1996

§ 102(e) Date: Oct. 7, 1996

[87] PCT Pub. No.: WO95/27672

PCT Pub. Date: Oct. 19, 1995

[30] Foreign Application Priority Data

Apr. 12, 1994 [DE] Germany .......................... 9406061 U

[51] Int. Cl.⁶ .................................................. B61B 9/00
[52] U.S. Cl. ......................... 104/88.03; 104/91; 104/96; 104/99; 104/172.4
[58] Field of Search ............................. 104/88.01, 88.02, 104/88.03, 91, 96, 99, 103, 172.4, 172.1

[56] References Cited

U.S. PATENT DOCUMENTS

| 3,509,826 | 5/1970 | Eliassen | 104/91 |
|---|---|---|---|
| 4,051,969 | 10/1977 | Homanick | 104/48 |
| 4,106,636 | 8/1978 | Ouimet et al. | 104/88.03 |
| 4,770,122 | 9/1988 | Ichihashi et al. | 104/88.03 |
| 5,111,750 | 5/1992 | Nozaki et al. | 104/99 |

FOREIGN PATENT DOCUMENTS

| 0 565 000 | 10/1993 | European Pat. Off. . |
|---|---|---|
| 0 582 224 | 2/1994 | European Pat. Off. . |
| 24 09 999 | 9/1977 | Germany . |
| 42 29 347 | 3/1994 | Germany . |

*Primary Examiner*—S. Joseph Morano
*Attorney, Agent, or Firm*—Lyon & Lyon LLP

[57] ABSTRACT

A suspension conveyor and sorting installation for the sequential sorting of individually conveyed objects. The installation includes two parallel conveyor paths arranged side by side and driven in opposite directions. Independent roller devices carry objects to be sorted and are conveyed by getting coupled to pushing members. Stop members stop the roller devices on associated conveyor paths, so that the roller devices can be uncoupled from the pushing members. A transfer apparatus is provided between the conveyor paths at a distance from their respective ends, for transferring the objects conveyed along the conveyor paths, from one conveyor path to the other conveyor path. Finally, a sorting controller, connected to the transfer mechanism and the stop members, controls the sorting of the conveyed objects such that the objects are sorted while remaining on the conveyor paths.

15 Claims, 7 Drawing Sheets

INSTALLATION FOR THE SORTING OF INDIVIDUALLY CONVEYED OBJECTS

The invention relates to a suspension conveyor and sorting installation.

In operation, the installation according to the invention may be used to sort all such objects which are arranged serially in any irregular order and are to be sorted into a predetermined order or assembled to groups of predetermined order. In a preferred embodiment, the installation according to the invention is designed to automatically sort clothes suspended on coat hangers which, in turn, are suspended on carrier elements driven by conveying means. In this embodiment, identification codes may be attached to the coat hangers or carrier elements and may be detected by sensors, the signals of which are fed to the control unit of the installation. The conveyor paths may in particular be arranged as stoppage or accumulation paths in which the objects can be accumulated by means of stop members while the conveying means continue circulating. This may be achieved, for example, by suspending the carrier elements on a rail and designing the drive connection to the circulating conveying means such that the connection is partly or entirely releasable or remains engaged only in the form of a slight friction.

An installation of the abovementioned type for sorting clothes suspended on coat hangers has already been suggested wherein the unsorted clothes circulate with their coat hangers in the conveyor circuit and are selectively transferred to a second conveyor circuit through an automatically actuable switch. In the second circuit, the transferred clothes are sequentially accumulated in individual groups. However, such a sorting process is still relatively time consuming.

The invention solves the problem of how to design an installation of the abovementioned type such as to enable the sorting of a multiplicity of objects circulating on the conveyor circuit to be carried out in a flexible and comparatively speedy manner.

In accordance with the invention, this object is achieved by suspension conveyor and sorting installation in which a transfer apparatus is provided between the conveyor paths at a distance from their ends, for transferring the objects conveyed along the conveyor paths, from one conveyor path to the other conveyor path. A sorting controller, connected to the transfer mechanism and the stop members, controls the sorting of the conveyed objects such that the objects are sorted while remaining on the conveyor paths. Additional advantageous embodiments are also described.

Thus, according to the invention, the objects are not sorted by transferring them selectively from one conveyor circuit to another conveyor circuit, but by transferring them selectively from one conveyor path to the other conveyor path within the same conveyor circuit. Owing to this arrangement, the sorting process is performed at a high velocity even if a great multiplicity of objects is involved. As the selectivity of the sorting process can be practically increased to any desired degree by providing additional transfer mechanisms between the two conveyor paths and between the ends thereof, the installation according to the invention allows a high sorting efficiency to be achieved. At any of these transfer mechanisms, an object can be selectively taken out of the set of objects being conveyed on one of the conveyor paths and transferred selectively to the other conveyor path, in particular into an interval between other objects or, as the case may be, into a group of objects present on the other conveyor path.

Further, in the installation according to the invention, the conveyor paths are not only suitable for conveying the objects, but they are also designed as stop and storage paths, i.e. provided with stop members in order that the objects can be accumulated in groups on all the path portions, or on predetermined path portions, while the conveying means continue circulating; this is achieved by providing a driving connection between the conveying means and the carrier elements which can be released in a controlled fashion at said path portions, or remains engaged only in the form of a slight friction, for example.

If desired, the rotating transfer mechanism itself may likewise take the form of an accumulator for a plurality of the objects, thus further enhancing the versatility of the installation according to the invention.

At both ends of the conveyor paths, the conveyed objects may be transferred from one conveyor path to the other conveyor path, resulting in an endless conveyor circuit. Further, the transfer mechanism according to the invention may be constructed such that objects circulating in the conveyor circuit can be transferred only in one direction from one conveyor path to the other conveyor path. It is preferred, however, that the suitably designed transfer mechanism be controllable to transfer objects selectively not only from one conveyor path to the other conveyor path, but also the other way round, from the other conveyor path to the first one, which further raises the selectivity of the sorting process.

According an advantageous embodiment of the invention, the conveyor paths driven in opposite directions are operatively interconnected at both ends thereof to form a conveyor circuit circulating in the same rotational direction as the transfer mechanism.

According to a further embodiment of the invention, the transfer mechanism is designed such that the objects can be controlled to be selectively transferred from the first-mentioned or the other conveyor path, respectively, to the transfer mechanism and from the transfer mechanism back to the first-mentioned or the other conveyor path, respectively. This means that the sorting resolution can be improved by feeding an object temporarily back to the same conveyor path from which it was initially diverted.

If desired, the utilisation of the installation according to the invention can be improved by ensuring that the directions of travel of the conveyor paths and of the transfer mechanism can be reversed together.

The conveying velocity on the conveyor paths may be the same as the transfer velocity at which the objects are transferred from one conveyor path to the other conveyor path. It is also possible, however, to ensure by design measures known as such, that the transfer mechanism and the conveyor paths—which, as mentioned above, may be also interconnected to advantageously form a conveyor circuit—can be driven at different velocities. In this context, it is further possible to provide for a control unit allowing the velocity particularly of the transfer mechanism to be changed independently of the conveying velocity on the conveyor paths, thus providing an additional possibility of controlling the place of the object to be transferred within the sequence of the other objects being conveyed on the other conveyor path.

The transfer mechanism may be basically comprised of a driven path portion connected to the conveyor paths through switches. In such an arrangement, the transfer mechanism may be driven in the same manner as the conveyor paths, for instance by means of a conveyor chain having pusher means mounted thereon, the pusher means being adapted to be coupled to the individual roller devices. However, other forms and types of transfer mechanisms are likewise possible and advantageous. For example, the transfer mechanism may be advantageously formed as a rotatably driven transfer wheel arranged to receive the individual roller devices sequentially from the first conveyor path and to transfer such roller devices to the second conveyor path upon rotation through 180°.

Likewise, gripping claws are generally possible which lift the individual roller devices from the first conveyor path and transpose them to the other conveyor path. In other terms, it is possible to provide the transfer mechanism for example with liftable gripping claws such that the object to be transferred is taken out of the set of objects, travelling on the first conveyor path past the transfer mechanism, by lifting or lowering the object, whereafter the object is placed on the other conveyor path by lowering or lifting it back, respectively.

Preferably, however, the plane of conveyance remains the same throughout the conveyor paths and the transfer mechanism, by combining the transfer mechanism or the driven transfer conveyor path with controlled transfer means, in particular switches, for transferring a given object selectively from one conveyor path towards the transfer mechanism and from the transfer mechanism towards the other conveyor path.

At their ends, the conveyor paths may be connected to each other by a reversal pulley reverting the conveying means from one conveyor path to the other conveyor path. It is preferred, however, that the conveyor paths be interconnected at least at one of their ends by an additional transfer mechanism allowing the objects to be transferred from the first conveyor path to the other conveyor path, or from the other conveyor path to the first conveyor path.

This arrangement may comprise a transverse conveyor path and, particularly with the help of transfer means such as switches, the objects may be transferrable in a controlled and selective manner from the transverse conveyor path to the additional transfer wheel or from the additional transfer wheel to the transverse conveyor path, respectively. The transverse conveyor path may in particular serve to supply objects to the conveyor circuit and to discharge the objects from the conveyor circuit.

If the conveyor paths are interconnected at both ends thereof by a respective additional transfer mechanism, and at least one of the two conveyor paths is connected at both ends thereof to a storage path, the objects can likewise be controlled to be selectively transferred in particular by transfer means, such as switches, from the conveyor circuit to the storage path or vice versa, from the storage path to the conveyor circuit; said storage path may likewise be provided with a driven conveying means, or may comprise a rail, for example, lacking separate conveying means and allowing the objects to be removed manually from the rail or permitting new objects to be placed on it.

While it is possible for the installation according to the invention to comprise only one conveyor circuit according to the invention, the preferred embodiment of the invention provides for a plurality of parallel conveyor circuits according to the invention, each conveyor circuit being equipped with at least one transfer mechanism between the ends of the two conveyor paths, and all the conveyor circuits communicating through the transverse conveyor path.

The invention will be explained with reference to embodiments illustrated schematically in the drawings in which the conveyor circuits and transfer mechanisms are represented as mere lines.

According to FIG. 1, there are provided six conveyor circuits 1a to 1f each comprising two parallel conveyor paths 2, 3; both ends of each conveyor path 2, 3 are connected to the respective ends of the other conveyor path through transfer wheels 5a and 5b, respectively, such that at said ends the objects 7 to be conveyed can be conveyed from one conveyor path 2 to the other conveyor path 3, and from the second conveyor path 3 back to the first conveyor path 2. Between the two respective ends of the conveyor paths 2, 3 and between the conveyor paths 2, 3, there are arranged five transfer mechanisms 4a to 4e in the form of transfer wheels accessible through controlled switches (not shown); the transfer mechanisms 4a to 4e are capable of transferring any passing object from the first conveyor path 2 to the second conveyor path 3 or from the second conveyor path 3 to the first conveyor path 2. These operations are selectively controlled by a suitable control unit through sensors detecting identification codes attached to the objects 7 or their carrier elements.

The parallel conveyor circuits 1a to 1f communicate through a common transverse conveyor 6 by which the objects 7 to be sorted can be fed to one of the conveyor circuits 1a to 1f, transferred from one conveyor circuit to another conveyor circuit, and discharged from the conveyor circuits with the help of the transfer wheels 5a.

In FIG. 1, three different types of objects 7a to 7c to be conveyed are indicated by squares, blackened circles and crosses, respectively. To explain the sorting process, FIG. 1 illustrates the respective sorting progress in the six conveyor circuits, although the sorting progress in reality takes place in a single conveyor circuit. As shown, the objects 7a to 7c are arranged irregularly one behind the other on the conveyor path 3 of the first conveyor circuit 1a, in the order in which the objects 7a to 7c have been supplied from the transverse conveyor 6. These objects 7a to 7c are sorted at the first transfer wheel 4a such that the objects 7a and 7b are transferred by the transfer wheel 4a from the conveyor path 3 to the conveyor path 2, whereas the objects 7c are left out and will stay on the conveyor path 3. This is shown for the second conveyor circuit 1b. During the subsequent sorting step, the objects 7a and 7b transferred to the conveyor path 2 and back to the conveyor path 3 are sorted by the transfer wheel 4a such that only the objects 7a are transferred from the conveyor path 3 to the conveyor path 2 while the objects 7b pass the transfer wheel 4a and remain on the conveyor path 3, as shown for the conveyor circuit 1c. At this time, the objects 7a to 7c have therefore been sorted to groups each containing only objects 7a, 7b or 7c, respectively.

FIG. 1 moreover illustrates how the objects 7 can be sorted in a given order, even within their respective groups, according to individual characteristics represented in FIG. 1 by numerals 1 to 5 relating to the objects 7. With respect to the group of objects 7c shown in conveyor circuit 1b, said sorting is achieved through the transfer wheels 4b to 4e and 5b by having the transfer wheel 4b transfer the objects referenced no. 1 from conveyor path 3 to conveyor path 2, while the transfer wheel 4c transfers the objects referenced no. 2 from conveyor path 3 to conveyor path 2 etc., as shown in conveyor circuit 1c. A corresponding transfer is carried out with respect to the groups of objects 7a and 7b, respectively, as shown in the conveyor circuits 1d and 1e, until the objects 7c to 7a are assembled on conveyor path 2 in the order of their reference numerals and in a sequence of groups, as shown in conveyor circuit 1f. The groups can be discharged now one after another to the transverse conveyor 6.

Figure 2:
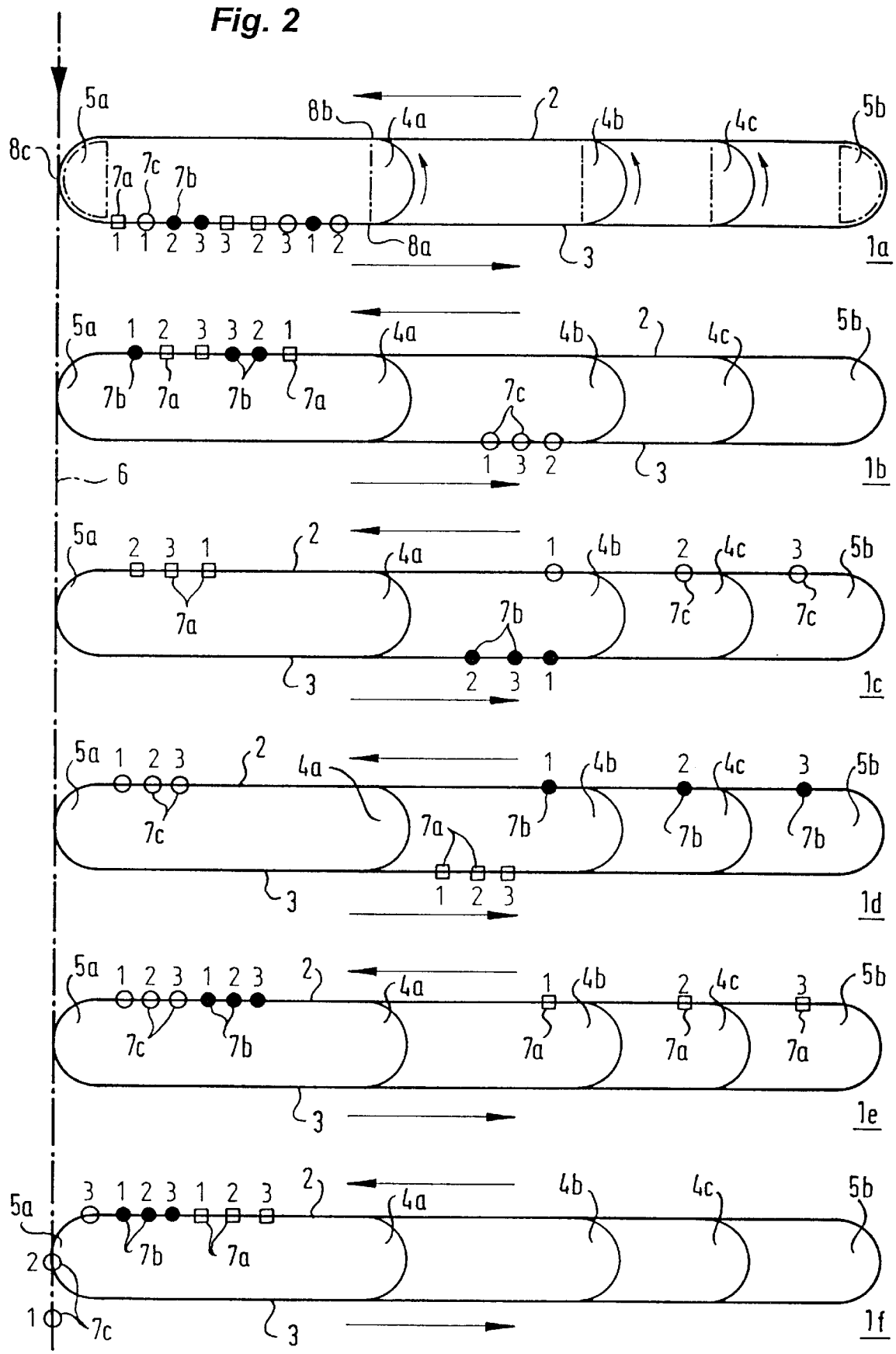

The embodiment according to FIG. 2 corresponds basically to that of FIG. 1 except that the transfer mechanisms 5a, 5b and 4a to 4c are designed such that the objects can be transferred only from the conveyor path 3 to the conveyor path 2. Like in FIG. 1, the sorting steps for sorting the objects 7a, 7b and 7c into groups, and according to characteristics within each group, are illustrated for the conveyor circuits 1a to 1f, based on the understanding again that the sequence of steps shown for the six conveyor circuits 1a to 1f is performed sequentially in each of the conveyor circuits. Incidentally, it is not necessary that the conveyor circuits 1a to 1f each comprise the same number of transfer mechanisms 4; rather, the number of transfer mechanisms 4 may vary from one conveyor circuit to another. As is further apparent from FIG. 2, the number of transfer mechanisms 4 and 5b arranged between the ends of the conveyor paths 2, 3 and at the end of the conveyor circuits 1 opposite to the transverse conveyor 6 exceeds by one the number of the distinctive characteristics determining the sorting order of the objects 7a, 7b and 7c within their respective groups.

If a conveyor circuit 1 according to FIG. 2 is supposed to sort—in at least one of the groups—objects having more than the three distinctive characteristics indicated, it is advantageous to design in particular the transfer mechanism 4a in the form of a transfer wheel such that the objects can be transferred not only from the conveyor path 3 to the conveyor path 2 but also the other way round, from conveyor path 2 directly back to conveyor path 3. Owing to such an arrangement it will then be possible, for example, to direct a subgroup of objects 7—of a group not yet sorted in the desired order—through the transfer mechanism 4b via the transfer mechanism 4a back to the conveyor path 3, and to rearrange the subgroup on conveyor path 3 in the proper order with the help of the transfer mechanisms 4b, 4c and 5b.

Figure 3:
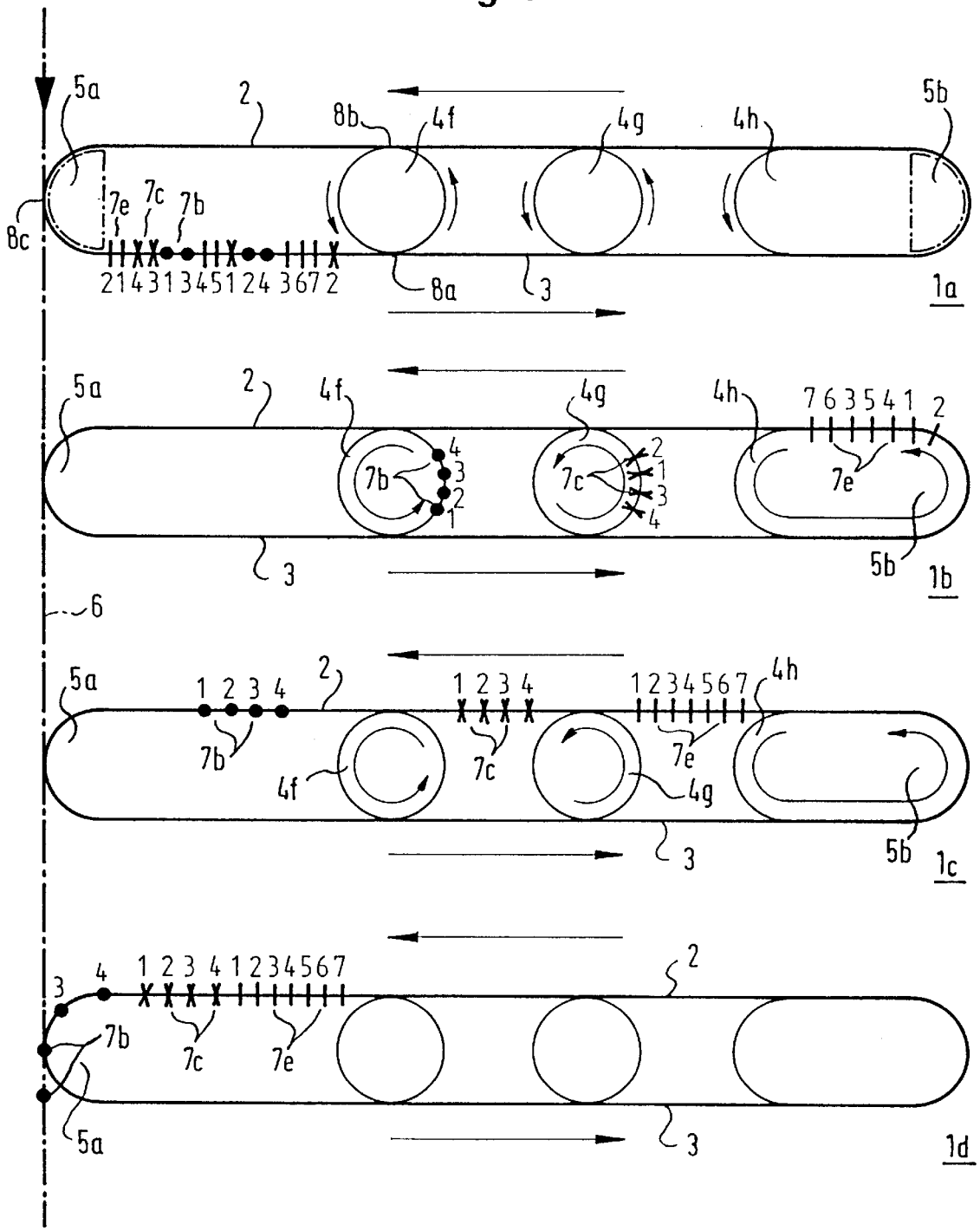

In the embodiment shown in FIG. 3, two transfer wheels 4f and 4g are provided between the ends of the conveyor paths 2, 3 and allow the objects 7 to be transferred, by means of switches 8a and 8b, from one conveyor path 2 to the other conveyor path 3, from said other conveyor path 3 to the first conveyor path 2, or from conveyor path 2 or 3 back to the conveyor path 2 or 3, respectively, after a full circulation; further, a third transfer wheel 4h is provided for transferring objects 7 only from the conveyor path 2 to the conveyor path 3 in the indicated conveying direction of the conveyor paths 2, 3 travelling in opposite directions. As can be seen in conveyor circuit 1b, the transfer mechanisms 4f and 4g as well as the conveyor path between the transfer mechanism 4h and 5b are arranged to accumulate a plurality of objects 7b, 7c and 7e in order to assemble the objects 7b, 7c and 7e, respectively, in separate groups. Also in this case, the objects 7 can be sorted even within the groups in a desired order by circulating the objects within the groups on the transfer wheels 4f, 4g or in the transfer circuits 4h and 5b, or by dispensing the respective object to the conveyor path 2.

Figure 4:
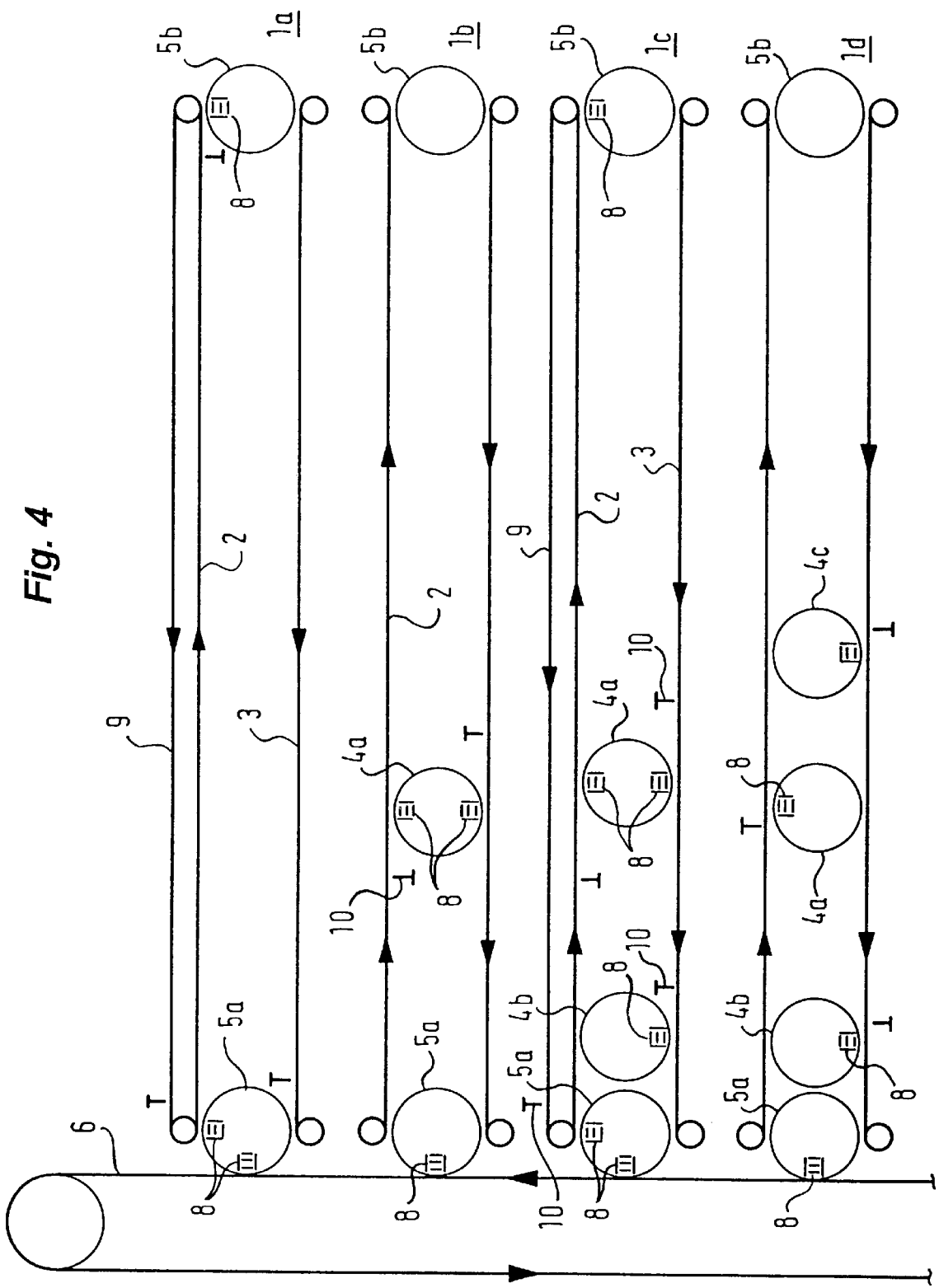

While the FIGS. 1 to 3 show conveyor circuits 1 of even type to allow at the same time the sorting process to be illustrated, FIG. 4 schematically depicts an embodiment of an installation according to the invention comprising four conveyor circuits 1a to 1d each having a different structure. The conveyor circuit 1a is a conventional conveyor circuit without any transfer mechanism in it. The conveyor circuits 1b to 1d are conveyor circuits according to the invention comprising a transfer mechanism 4a, two transfer mechanisms 4a, 4b and three transfer mechanisms 4a, 4b, 4c, respectively, in the respective conveyor circuits 1. Reference numeral 8 designates switches, whereas reference numeral 10 denotes controlled stop members at which the objects arriving at the respective portion of conveyor path 2 or 3 can be stopped and, thus, accumulated while the conveying means continue running. At the transfer mechanism 4a—implemented as a transfer wheel—of conveyor circuit 1b, both the conveyor path 2 and conveyor path 3 are each provided with a switch 8 allowing objects arriving at the transfer mechanism 4a to be selectively and controllably transferred from the conveyor path 2 to the conveyor path 3 or from the conveyor path 3 to the conveyor path 2. The same applies to the transfer mechanism 4a of conveyor circuit 1c. On the other hand, the transfer mechanism 4b of conveyor circuit 1c and the transfer mechanisms 4a to 4c of the other conveyor circuit 1d are each provided with only one switch 8; hence, the objects can be transferred only in one direction, from conveyor path 2 to conveyor path 3 or from conveyor path 3 to conveyor path 2. In conveyor circuit 1c, one conveyor path 2 is provided at both ends thereof with a storage path 9 for empty carrier elements, for example. The storage path 9 is controllably and selectively accessible through an additional transfer mechanism 5b likewise equipped with a switch 8 and arranged at the end of conveyor path 2 opposite to the transverse conveyor 6. In this conveyor circuit 1c, the transfer mechanism 5a adjacent to the transverse conveyor 6 comprises an additional switch 8 through which the carrier elements stored on storage path 9 can be recirculated—individually or in groups—to the conveyor path 2 or discharged to the transverse conveyor 6 via the transfer mechanism 5a.

To fulfill the mentioned purpose, the transfer mechanisms and conveyor paths may comprise structural features known as such. The same is true for other control and auxiliary elements, such as sensors, switches, stop members or the like, and for computer based control units.

Figure 5:
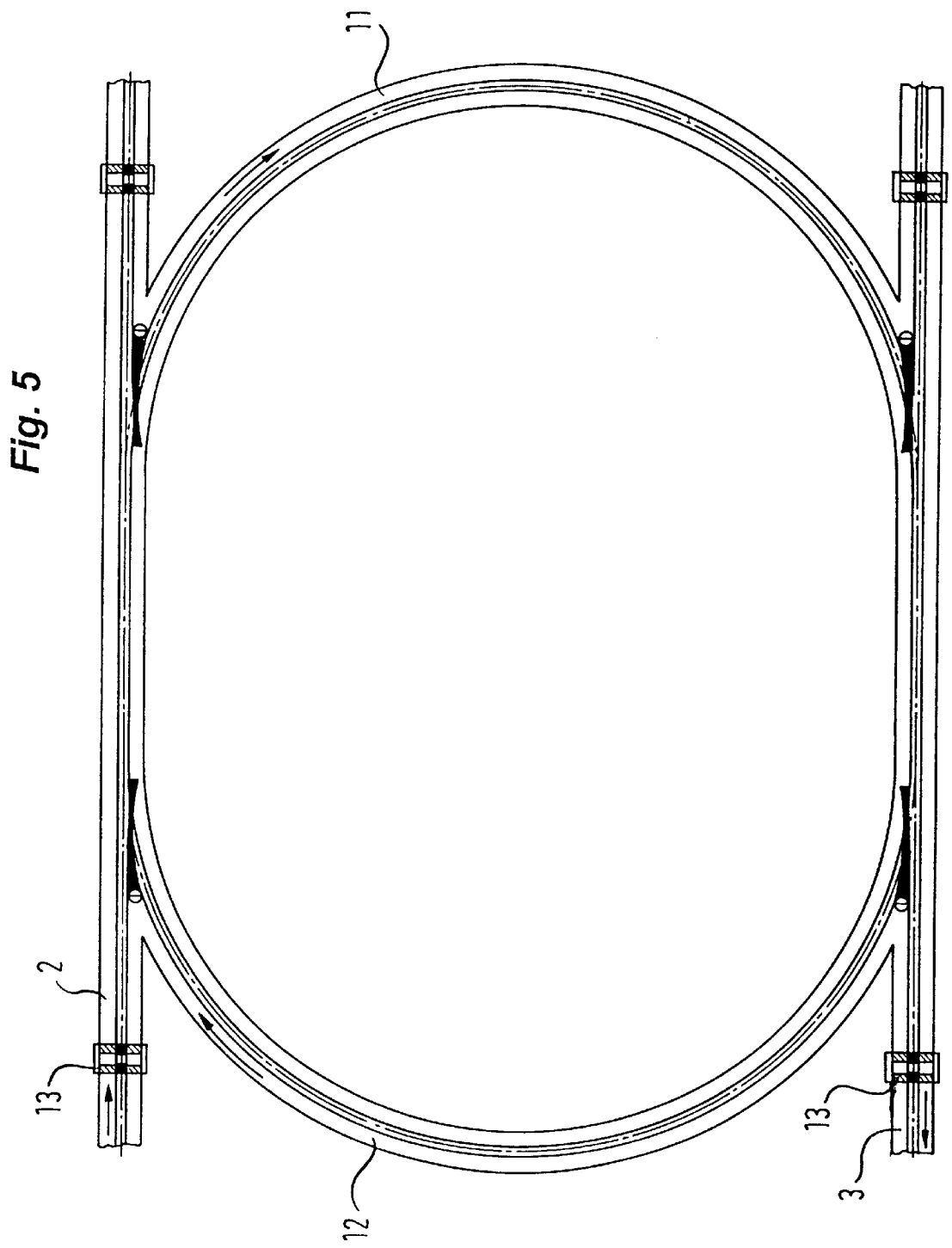

An example of a transfer mechanism combination is shown in FIG. 5, where a first transfer mechanism part 11 serves to transfer roller devices 13 from conveyor path 2 to conveyor path 3, while a second transfer mechanism 12 serves to transfer the roller devices 13 from conveyor path 3 to conveyor path 2. The arrows indicate the travelling direction of the roller devices which can be diverted from the conveyor paths 2 and 3, respectively, by means of switch blades, and can be transferred to the transfer mechanisms 11 or 12, respectively, which are formed as conveyor paths driven by a chain drive. The transfer mechanisms 11 and 12 may be put together closely enough to form a circle, as shown in FIGS. 1, 3 and 4, for example.

Figure 6:
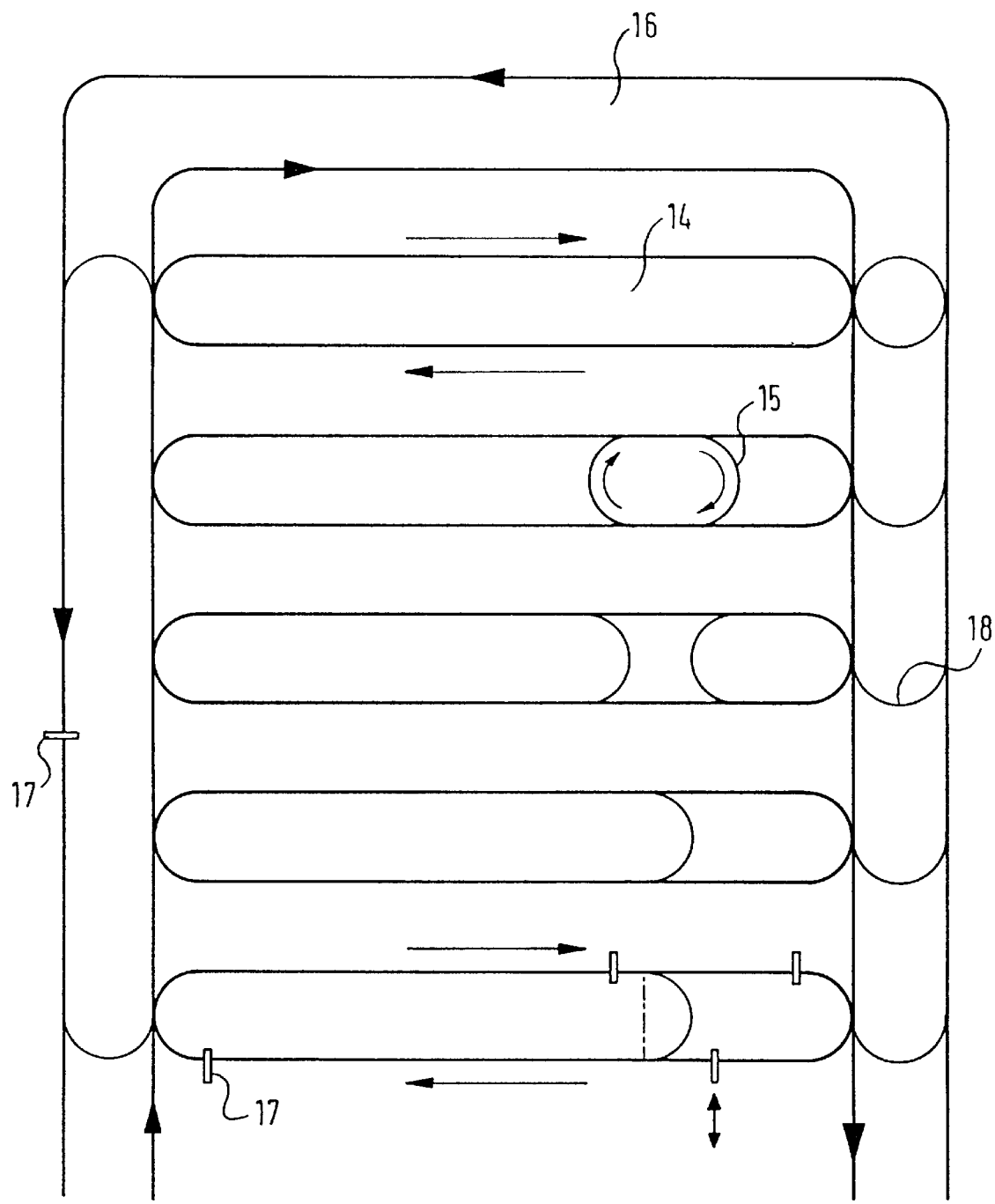

FIG. 6 illustrates another variation of a combination of transfer mechanisms with conveyor circuits where a plurality of conveyor circuits 14, partly equipped with transfer mechanisms, are connected at both ends thereof to a transverse conveyor circuit 16 in the shape of a horseshoe. Both the transverse conveyor circuit 16 and the individual conveyor circuits 14 connected thereto may be provided with stop members 17 at any location. In addition, the transverse conveyor circuit 16 in the shape of a horseshoe may be provided with further transfer mechanisms 18.

Figure 7:
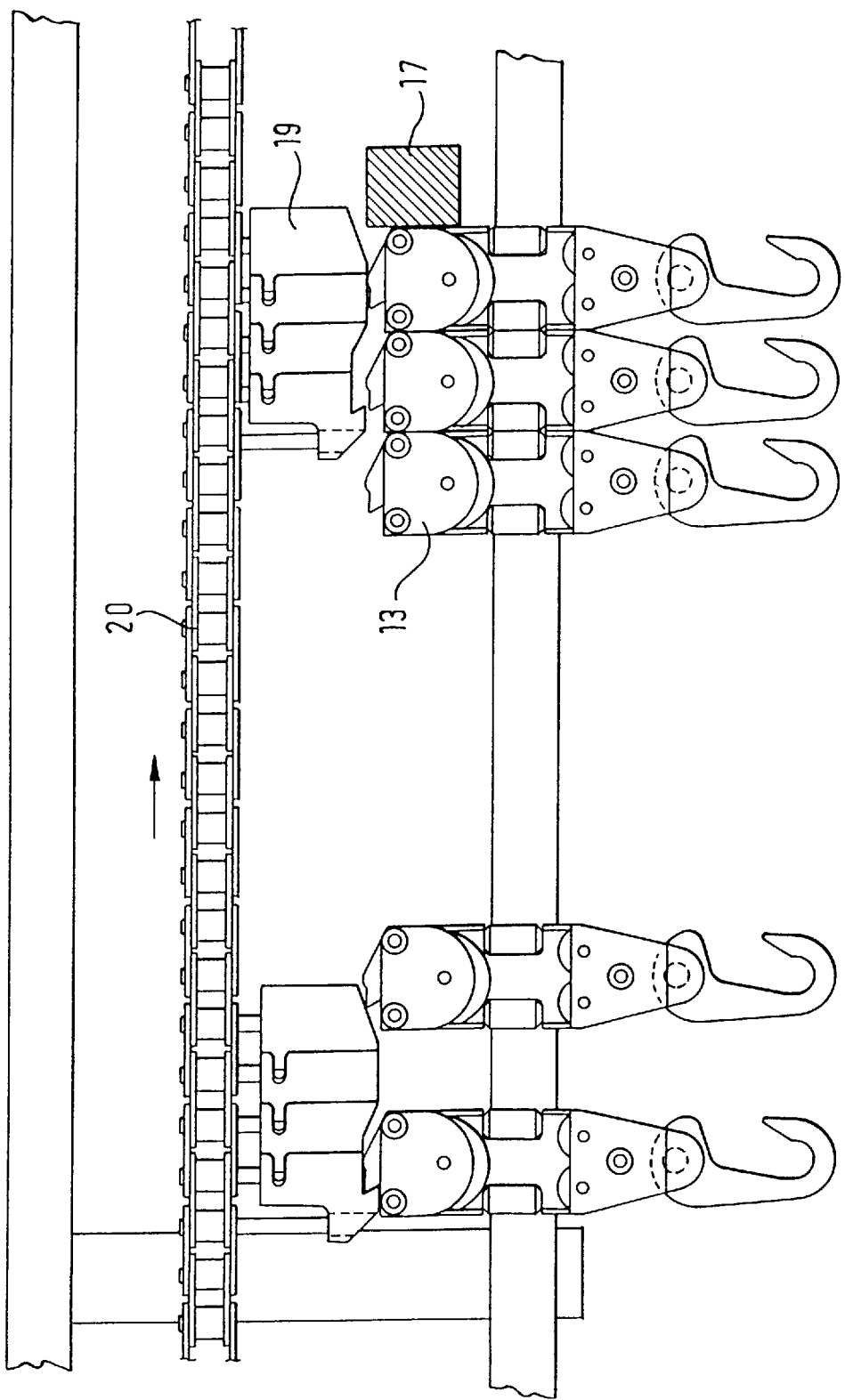

FIG. 7 shows the roller devices 13 and pusher means 19 which can be coupled to, and uncoupled from, the roller devices 13. The pusher means 19 are conveyed by a conveyor chain 20. Schematically depicted is also a stop member 17 onto which one of the roller devices can abut, whereafter a succeeding roller device abuts onto the first-mentioned roller device etc. In this way, a respective pusher means 19 may be automatically uncoupled from the associated roller device with the help of suitable abutment bevels, for example.

We claim:

1. A suspension conveyor and sorting installation for the sequential sorting of individually conveyed objects (7), comprising:

two parallel conveyor paths (2, 3) arranged side by side and driven in opposite directions, a plurality of individual roller devices (13) independent of each other which carry the objects (7) to be sorted and are adapted to be conveyed by getting coupled to pusher means (19), at least one stop member (17) for stopping the roller devices on an associated one of the conveyor paths (2, 3), for which purpose the roller devices (13) can be uncoupled from the pusher means (19), a transfer mechanism (4) being provided between the conveyor paths (2, 3), at a distance from their ends, for transferring the objects (7) conveyed along the conveyor paths (2, 3), from one conveyor path (2) to the other conveyor path (3), and a sorting controller, wherein the sorting controller controls the transfer mechanism (4) and the at least one stop member (17) so as to place the objects (7) in a predetermined sequence on the conveyor paths (2, 3).

2. The installation according to claim 1, the conveyor paths driven in opposite directions being operatively interconnected at both ends thereof to form a conveyor circuit (1) circulating in the same rotational direction as the transfer mechanism (4).

3. The installation according to claim 1, can the transfer mechanism (4) can also being controlled to transfer the objects (7) selectively from the other conveyor path (3) to the first-mentioned conveyor path (2).

4. The installation according to claim 1, the objects (7) being controlled to be selectively transferred from the first-mentioned (2) or the other conveyor path (3), respectively, to the transfer mechanism (4) and from the transfer mechanism (4) back to the first-mentioned (2) or the other conveyor path (3), respectively.

5. The installation according to claim 1, the directions of travel of the conveyor paths (2, 3) and of the transfer mechanism (4) being reversible together.

6. The installation according to claim 1, the transfer mechanism (4) and the conveyor paths (2, 3) being drivable at different velocities.

7. The installation according to claim 1, the transfer mechanism (4) being designed as a rotating transfer wheel.

8. The installation according to claim 7, the transfer wheel being formed as a conveyor wheel, while controlled transfer means are provided for transferring a given object (7) from one conveyor path to the conveyor wheel and from the conveyor wheel to the other conveyor path.

9. The installation according to claim 8, the controlled transfer means being switches (8).

10. The installation according to claim 1, the transfer mechanism (4) being arranged to allow a plurality of the conveyed objects (7) to be accumulated on the transfer mechanism.

11. The installation according to claim 1, the conveyor paths (2, 3) being interconnected at one end by an additional transfer mechanism (5) controlled by the sorting controller, allowing the objects to be transferred from one conveyor path (2) to the other conveyor path (3), or from the other conveyor path (3) to the first-mentioned conveyor path (2), respectively.

12. The installation according to claim 11 the additional transfer mechanism (5) being arranged to allow a plurality of the conveyed objects (7) to be accumulated on the additional transfer mechanism (5).

13. The installation according to claim 11, further including a transverse conveyor path (6) arranged to allow objects (7) to be transferred controllably and selectively from the transverse conveyor path (6) to an additional transfer mechanism (5a) controlled by the sorting controller, or from the additional transfer mechanism (5a) to the transverse conveyor path (6).

14. The installation according to claim 1, the conveyor paths (2, 3) being interconnected at both ends, wherein each end is interconnected by an additional transfer mechanism (5) controlled by the sorting controller, allowing objects (7) to be transferred from one conveyor path (2) to the other conveyor path (3), or from the other conveyor path (3) to the first-mentioned conveyor path (2), respectively.

15. The installation according to claim 14, at least one of the two conveyor paths (2,3) being connected at both ends thereof to a storage path (9) accessible via the additional transfer mechanism at each end.

* * * * *

UNITED STATES PATENT AND TRADEMARK OFFICE
CERTIFICATE OF CORRECTION

PATENT NO. : 5,806,434
DATED : September 15, 1998
INVENTOR(S) : ENDERLEIN et al.

It is certified that error appears in the above-identified patent and that said Letters Patent is hereby corrected as shown below:

In claim 3 (col. 7, l. 26), delete "can".

In claim 3 (col. 7, l. 27), delete "can".

Signed and Sealed this

Twenty-third Day of March, 1999

Attest:

Q. TODD DICKINSON

Attesting Officer

Acting Commissioner of Patents and Trademarks